(12) United States Patent
Li et al.

(10) Patent No.: US 9,738,527 B2
(45) Date of Patent: Aug. 22, 2017

(54) GRAPHENE-BASED MATERIALS

(71) Applicant: MONASH UNIVERSITY, Clayton (AU)

(72) Inventors: Dan Li, Glen Waverly (AU); Ling Qiu, Clayton (AU)

(73) Assignee: MONASH UNIVERSITY, Clayton (AU)

( * ) Notice: Subject to any disclaimer, the term of this patent is extended or adjusted under 35 U.S.C. 154(b) by 0 days.

(21) Appl. No.: 14/423,279

(22) PCT Filed: Aug. 23, 2013

(86) PCT No.: PCT/AU2013/000939
§ 371 (c)(1),
(2) Date: Feb. 23, 2015

(87) PCT Pub. No.: WO2014/028978
PCT Pub. Date: Feb. 27, 2014

(65) Prior Publication Data
US 2015/0259212 A1    Sep. 17, 2015

(30) Foreign Application Priority Data
Aug. 23, 2012   (AU) ............................... 2012903643

(51) Int. Cl.
*C01B 31/04*     (2006.01)
*B82Y 40/00*     (2011.01)
(Continued)

(52) U.S. Cl.
CPC .......... *C01B 31/0484* (2013.01); *B82Y 40/00* (2013.01); *C01B 31/00* (2013.01);
(Continued)

(58) Field of Classification Search
CPC . C01B 31/0484; C01B 31/0446; B82Y 40/00; B82Y 30/00
See application file for complete search history.

(56) References Cited

U.S. PATENT DOCUMENTS 8,051,666 B2    11/2011   Theriault
2006/0068187 A1   3/2006   Krueger et al.
(Continued)

FOREIGN PATENT DOCUMENTS

AU  WO 2012006657 A1 *  1/2012  ......... B01D 67/0079
WO  WO 2012/144993 A1   10/2012

OTHER PUBLICATIONS

Supplementary European Search Report and Search Opinion issued in European Patent Application No. EP 13831693 dated Feb. 22, 2016.
(Continued)

*Primary Examiner* — Hai Vo
(74) *Attorney, Agent, or Firm* — Arent Fox LLP

(57) ABSTRACT

The present invention relates to graphene-based foam, the graphene-based foam having a structure defined by a three-dimensional network of interconnected and ordered open cells, the open cells being defined by cell walls, the cell walls (i) being formed of graphene sheets, partially reduced graphene oxide sheets, reduced graphene oxide sheets, or a combination thereof, and (ii) having a thickness defined by the thickness of a plurality of graphene sheets, partially reduced graphene oxide sheets, reduced graphene oxide sheets, or a combination thereof.

9 Claims, 9 Drawing Sheets

(51) Int. Cl.
*C01B 31/00* (2006.01)
*B82Y 30/00* (2011.01)
(52) U.S. Cl.
CPC ........... *C01B 31/0446* (2013.01); *B82Y 30/00* (2013.01); *C01B 2204/04* (2013.01); *Y10T 428/24306* (2015.01); *Y10T 428/249921* (2015.04); *Y10T 428/249953* (2015.04)

(56) References Cited

U.S. PATENT DOCUMENTS

| | | |
|---|---|---|
| 2009/0146111 A1 | 6/2009 | Shin et al. |
| 2010/0144904 A1 | 6/2010 | Wang et al. |
| 2012/0112117 A1 | 5/2012 | Vo et al. |
| 2013/0180912 A1* | 7/2013 | Li .................. B01D 67/0079 210/500.21 |

OTHER PUBLICATIONS

Bi H. et al., "Spongy graphene as a highly efficient and recyclable sorbent for oils and organic solvents", Advanced Functional Materials, 2012, vol. 22, pp. 4421-4425.
Chen W.F. et al, "In situ self-assembly of mild chemical reduction graphene for three-dimensional architectures", Nanoscale, 2011, 3, 3132-3137.
Chen Z. et al., "Supplementary Information: Three-dimensional flexible and conductive interconnected graphene networks grown by chemical vapour deposition", Nat. Mater., 2011, 10, 1-3.
Chen Z. et al., "Three-dimensional flexible and conductive interconnected graphene networks grown by chemical vapour deposition", Nat. Mater., 2011, 10, 424-428.
Doty R. et al., "Hierarchical Polymer Microlattice Structures", Advanced Engineering Materials 2012, 14, 503-507.
Estevez L. et al., Multifunctional Graphene/Platinum/Nafion Hybrids via Ice Templating:, J. Am. Chem. Soc. 2011, 133, 6122-6125.
Gogotsi Y., "High-Temperature Rubber Made from Carbon Nanotubes", Science 2010, 330, 1332-1333.
Li C. et al., "Three-dimensional graphene architectures", Nanoscale, 2012, vol. 4, No. 18, pp. 5549-5563.
Li W. et al., "Freeze casting of porous materials: review of critical factors in microstructure evolution", International Materials Reviews 2012, vol. 57, No. 1, pp. 37-60.
Mi X. et al., "Preparation of graphene oxide aerogel and its adsorption for CU 2+ ions", Carbon, 2012, vol. 50, pp. 4856-4864.
Qiu L. et al., "Biomimetic superelastic graphene-based cellular monoliths", Nature Communications, 2012, vol. 3, Article 1241.
Vickery J. et al., "Fabrication of Graphene-Polymer Nanocomposites With Higher-Order Three-Dimensional Architectures", Advanced Materials, 2009, 21, 2180.
Worsley M. et al., "Synthesis of Graphene Aerogel with high Electrical Conductivity", J. Am. Chem. Soc., 2010, 132, 14067-14069.
Xu Y. et al., "Self-Assembled Graphene Hydrogel via a One-Step Hydrothermal Process", ACS Nano, 2010, 4, 4324-4330.
Xu Z. et al., "Strong, conductive, lightweight, neat graphene aerogel fibers with aligned pores", ACS Nano., 2012, vol. 6, No. 8, pp. 7103-7113.
Zhang X. et al., "Mechanically strong and highly conductive graphene aerogel and its use as electrodes for electrochemical power sources", Journal of Materials Chemistry, 2011, vol. 21, pp. 6494-6497.
Zhu Y. et al. "Graphene and Graphene Oxide: Synthesis, Properties, and Applications", Advanced Materials 2010, 22, 3906-3924.

* cited by examiner

GRAPHENE-BASED MATERIALS

CROSS-REFERENCE TO RELATED APPLICATIONS

This application is a national phase application under 35 U.S.C. §371 of International Application No. PCT/AU2013/000939, filed Aug. 23, 2013, which claims priority to Australian Patent Application Serial No. 2012903643, filed Aug. 23, 2012. The entire contents of each of the above-referenced disclosures are specifically incorporated herein by reference without disclaimer.

FIELD OF THE INVENTION

The present invention relates in general to graphene-based materials, and more particularly it relates to graphene-based foam material, to a process for producing the same and to articles comprising the same.

BACKGROUND OF THE INVENTION

Graphene is a two-dimensional (2D) sheet structure of $sp^2$-bonded carbon atoms with unique electronic, chemical and mechanical properties. The significance of these unique properties is now just being realised, with graphene or graphene-based sheets being applied in various applications such as energy storage, catalysis, sensing and composites. In many of these applications to date it has been the 2D form of the graphene-based sheets that has been exploited.

To further realise the potential of graphene-based materials, a considerable amount of research has been directed toward forming three-dimensional (3D) graphene-based structures. One particular field of research showing great promise is the development of graphene-based foam structures.

A number of techniques have been developed for producing graphene-based foams. For example, 3D graphene-based porous materials have been prepared by self-gelation during the reduction of graphene oxide or through chemical vapour deposition (CVD) on porous metal templates. Despite providing for 3D graphene-based materials, such foams have generally been reported as having relatively poor mechanical properties such as being brittle and having low mechanical flexibility. Furthermore, the foams typically shrink during manufacture making the resulting dimensions of the foam difficult to control.

To address at least some of these problems, polymer/graphene composite foam structures have been developed. While incorporating polymer into the foam structure can impart improved mechanical properties such as compressibility, the advantageous properties of the graphene-based material per se can be inherently diminished.

Accordingly, there remains an opportunity to develop graphene-based foams that exhibit improved mechanical properties while at the same time minimising the loss of unique properties attributed to the graphene-based material per se.

SUMMARY OF THE INVENTION

The present invention provides for graphene-based foam, the graphene-based foam having a structure defined by a three-dimensional network of interconnected and ordered open cells, the open cells being defined by cell walls, the cell walls (i) being formed of graphene sheets, partially reduced graphene oxide sheets, reduced graphene oxide sheets, or a combination thereof, and (ii) having a thickness defined by the thickness of a plurality of graphene sheets, partially reduced graphene oxide sheets, reduced graphene oxide sheets, or a combination thereof.

The graphene-based foam itself may form part of a composition of matter.

The present invention therefore also provides for a composition comprising graphene-based foam, the graphene-based foam having a structure defined by a three-dimensional network of interconnected and ordered open cells, the open cells being defined by cell walls, the cell walls (i) being formed of graphene sheets, partially reduced graphene oxide sheets, reduced graphene oxide sheets, or a combination thereof, and (ii) having a thickness defined by the thickness of a plurality of graphene sheets, partially reduced graphene oxide sheets, reduced graphene oxide sheets, or a combination thereof.

Graphene-based foam according to the present invention has a unique hierarchical structure that mimics the structure of natural cellular foam materials such as cork. At one structural level the foam is defined by a three-dimensional network of interconnected and ordered open cells. For example, the cells may present in a honeycomb-like network. At a second structural level, the cells themselves are defined by cell walls that are formed of a plurality of graphene sheets, partially reduced graphene oxide sheets, reduced graphene oxide sheets, or a combination thereof.

This hierarchical structure of the graphene-based sheets is believed to impart unique properties to the resulting foam. For example, a graphene-based foam according to the present invention can be prepared such that it exhibits not only high porosity and a controllable density, but also excellent elasticity. In particular, graphene-based foam in accordance with the invention surprisingly can exhibit a low compression set value (for example less than 15%) when compressed 80% or more of its original volume.

Importantly, graphene-based foam per se in accordance with the invention can exhibit such advantageous properties in the absence of other materials such as polymer.

In one embodiment, the graphene-based foam comprises within its structure less than 50 wt %, less than 40 wt %, less than 30 wt %, less than 20 wt %, less than 10 wt %, less than 5 wt %, less than 2 wt %, or less than 1 wt % of polymer.

In a further embodiment, the graphene-based foam comprises within its structure substantially no polymer.

Without wishing to be limited by theory, it is believed that the unique hierarchical structure of the graphene-based foams in accordance with the invention gives rise to the enhanced properties of the foams. Furthermore, it is also believed that use of graphene sheets, partially reduced graphene oxide sheets, reduced graphene oxide sheets, or a combination thereof plays an important role in the formation of the hierarchical foam structure.

In one embodiment, the graphene-based foam in accordance with the invention has a compression set at 15% compression of 20% or less.

The unique properties of the polymer foams can also advantageously impart unique properties to polymers. For example, in one embodiment the graphene-based foam forms a scaffold structure within a polymer composition to provide for a composite structure.

Accordingly, the invention also provides a polymer composition comprising the graphene-based foam according to the invention.

In one embodiment, the polymer composition is a hydrogel.

As used herein the term "hydrogel" of the expression "polymer hydrogel" is intended to mean a polymer having a polymeric matrix that can absorb and be swollen by an aqueous liquid such as water. Those skilled in the art will appreciate that a hydrogel will typically exhibit a degree of crosslinking so that the polymeric matrix is not solvated by the aqueous liquid.

Where the graphene-based foam forms part of a polymer composition, rather than the polymer being used to improve the properties of the graphene-based foam (as is typically the case), the graphene-based foam can surprisingly and advantageously improve the properties of the polymer. For example, the foam can improve a polymer's mechanical properties and conductivity.

The present invention also provides a process of preparing graphene-based foam according to the invention, the process comprising providing a dispersion of graphene sheets, partially reduced graphene oxide sheets, reduced graphene oxide sheets, or a combination thereof in a freeze castable medium, and subjecting the dispersion to freeze casting.

The invention further provides a process of preparing graphene-based foam having a structure defined by a three-dimensional network of interconnected and ordered open cells, the open cells being defined by cell walls, the cell walls (i) being formed of graphene sheets, partially reduced graphene oxide sheets, reduced graphene oxide sheets, or a combination thereof, and (ii) having a thickness defined by the thickness of a plurality of graphene sheets, partially reduced graphene oxide sheets, reduced graphene oxide sheets, or a combination thereof, the process comprising providing a dispersion of graphene sheets, partially reduced graphene oxide sheets, reduced graphene oxide sheets, or a combination thereof in a freeze castable medium, and subjecting the dispersion to freeze casting.

The invention also provides a process of preparing graphene-based foam having a structure defined by a three-dimensional network of interconnected and ordered open cells, the open cells being defined by cell walls, the cell walls (i) being formed of graphene sheets, partially reduced graphene oxide sheets, reduced graphene oxide sheets, or a combination thereof, and (ii) having a thickness defined by the thickness of a plurality of graphene sheets, partially reduced graphene oxide sheets, reduced graphene oxide sheets, or a combination thereof, the process comprising providing a dispersion consisting essentially of graphene sheets, partially reduced graphene oxide sheets, reduced graphene oxide sheets, or a combination thereof within a freeze castable medium, and subjecting the dispersion to freeze casting.

It has now been found that the technique of freeze casting can be employed to prepare graphene-based foam structures having a unique hierarchical structure. Without wishing to be limited by theory, it is believed by employing freeze casting using a dispersion of graphene sheets, partially reduced graphene oxide sheets, reduced graphene oxide sheets, or a combination thereof enables the graphene-based sheets to not only be orientated in a fashion to form the cell walls, but also to have these sheets form into a three-dimensional network of interconnected and ordered open cells.

According to the process of the invention, the graphene-based foams can advantageously be prepared with a tailored pore size and density, and also with little if no, shrinkage. The resulting foam structure also has sound mechanical properties, and in particular structural elasticity.

Further aspects and/or embodiments of the invention are discussed in more detail below.

BRIEF DESCRIPTION OF THE DRAWINGS

The invention will herein be described with reference to the following non-limiting drawings in which.

Figure 1:
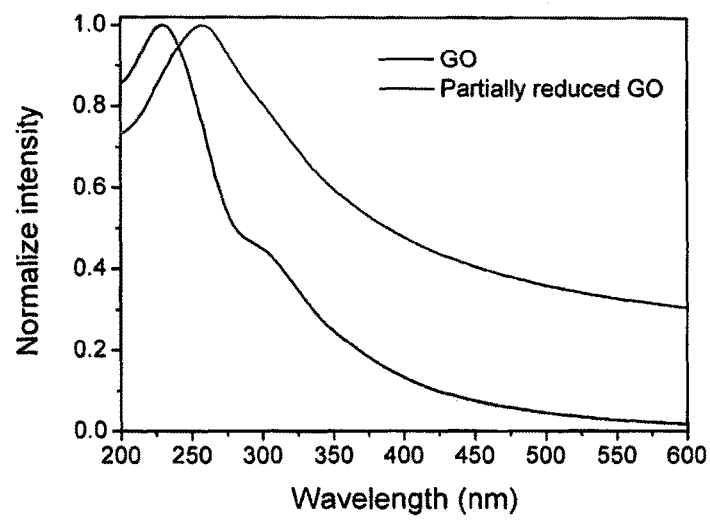
FIG. 1 illustrates UV-vis spectra of graphene oxide and partially reduced graphene oxide.

All Figures have been filed in colour and are available on request.

DETAILED DESCRIPTION OF THE INVENTION

Graphene is an allotrope of carbon having a one atom thick planar sheet structure of typically sp$^2$-bonded carbon atoms that are densely packed in a honeycomb 2D crystal lattice. The covalently bonded carbon atoms typically form repeating units that comprise 6-membered rings, but can also form 5-membered rings and/or 7-membered rings. A layer of such covalently bonded carbon atoms is commonly referred to as a graphene "sheet". Graphene may be prepared by exfoliation of graphite.

Graphene oxide is an oxygenated graphene that is typically prepared by exfoliation of graphite oxide. Graphene oxide is considered to have a graphene-like structure that is substituted with oxygenated groups such as hydroxyl and epoxide. Graphene oxide may be prepared using a number of techniques such as the so called Brodie, Staudenmaier, or Hummers methods.

While the atomic composition of graphene oxide can vary slightly depending upon the method by which it has been prepared, it will typically exhibit (when prepared in the form a dispersion in water) an absorption peak maxima, as measured by UV-VIS spectroscopy, within the range of about 223 to about 233 nm.

Despite having a different atomic composition to graphene, graphene oxide nevertheless has a sheet structure similar to graphene.

Unlike graphene, graphene oxide can be readily dispersed in an aqueous liquid such as water. In fact US 2010/0144904 discloses freeze casting of an aqueous dispersion of graphene oxide to prepare a graphene oxide aerogel. However, in contrast with the graphene-based foams of the present invention, the graphene oxide aerogel disclosed in US 2010/0144904 exhibits relatively poor mechanical properties. Notably, to provide the graphene oxide aerogel disclosed in US 2010/0144904 with acceptable mechanical properties the document discloses the need to reinforce the aerogel with polymer.

An important feature of graphene-based foam of the present invention is believed to be its unique hierarchical structure. Without wishing to be limited by theory, and as will be discussed in more detail below, the formation of this unique hierarchical structure is believed to stem at least in part from the use of graphene, partially reduced graphene oxide, reduced graphene oxide, or a combination thereof.

Those skilled in the art will appreciate that partially reduced or reduced graphene oxide is a material prepared by reducing graphene oxide. Partially reduced or reduced graphene oxide is chemically and physically different to graphene oxide. Techniques for reducing graphene oxide are well known in the art. For example, graphene oxide can be partially reduced or reduced by chemical reduction.

Partially reduced and reduced graphene oxide will typically exhibit (when prepared in the form a dispersion in water) an absorption peak maxima, as measured by UV-VIS spectroscopy, of at least about 235 nm.

In one embodiment, the partially reduced and reduced graphene oxide used in accordance with the invention exhibits (when prepared in the form a dispersion in water) an absorption peak maxima, as measured by UV-VIS spectroscopy, of at least about 240 nm, or at least about 250 nm, or at least about 260 nm, or at least about 270 nm, or at least about 275 nm.

In another embodiment, the partially reduced and reduced graphene oxide used in accordance with the invention exhibits (when prepared in the form a dispersion in water) an absorption peak maxima, as measured by UV-VIS spectroscopy, ranging from about 235 nm to about 275 nm, or from about 240 nm to about 275 nm.

Despite having a different composition to graphene, partially reduced and reduced graphene oxide nevertheless have a sheet structure similar to graphene.

In the context of the present invention the expression "graphene-based" foam is intended to mean that the foam has a structure that is made of graphene, partially reduced graphene oxide, reduced graphene oxide, or a combination thereof. The expression "graphene-based" may therefore be used herein as a convenient reference to graphene (sheets), partially reduced graphene oxide (sheets), reduced graphene oxide (sheets), or a combination thereof. As used in the context of the present invention, the expression "graphene-based" is not intended to embrace graphene oxide (sheets).

Compositions in accordance with the invention comprise graphene-based foam. The composition itself may in fact be the graphene-based foam, or the graphene-based foam may form only part of a more extensive composition. For example, the composition may be graphene foam that comprises a region or section of graphene-based foam according to the invention, or it may be a polymer composition comprising graphene-based foam according to the invention.

The graphene-based foam according to the invention has a structure defined by a three-dimensional network of interconnected and ordered open cells.

In the context of foam structures, those skilled in the art will appreciate that a cell within a foam defines a pore or opening within the foam structure. The cells of the foam according to the present invention are open cells in that the pore or opening which the cells define is not fully encased by a cell wall. In other words, the cell has an opening in it through which matter such as gas or liquid may pass. Typically the cells will have two separate openings through which matter such as gas or liquid may pass.

By being an "open cell" foam, the foam will comprise greater than 50% of open cells, for example at least 60% open cells, or at least 70% open cells, or at least 80% open cells, or at least 90% open cells. In one embodiment, substantially all cells in the graphene-based foam are open cells.

The open cells of the graphene-based foam according to the invention are interconnected and ordered. By the cells being "interconnected" is meant that a cell wall(s) which defines a given cell also defines at least part of an adjacent cell. In other words, the open cells in the foam share common cell walls. A cell at the edge of a foam structure may of course have a cell wall that is not common with an adjacent cell.

An important feature of the open cells within the graphene-based foam according to the invention is that they are defined by cell walls. By a "cell wall(s)" is meant a structural feature that defines the cell which has height and thickness dimensions where the height is greater than the thickness. In other words, the cell wall is not intended to represent a structural feature such as a mere strut where its width is similar to its height. The cell is therefore to have capsular character.

In one embodiment, the average cell wall height is at least 10 times, for example at least 100 times, or at least 1000 times, or at least 5000 times greater than the average cell wall thickness. In a further embodiment, the average cell wall height is from 10 to 5000, or 100 to 5000, or 1000 to 5000 times greater the average cell wall thickness.

In addition to being interconnected, the open cells of the graphene-based foam are also ordered. By "ordered" is meant that the cells are not all randomly orientated (e.g along their height axis) relative to each other. In other words, upon viewing a collection of adjoining cells it is apparent that the cells are interconnected in a relatively ordered fashion. Despite the cells being ordered, the general orientation of them can progressively vary throughout the foam. Nevertheless, regardless of a progressive change in orientation of cells relative to each other it will still be apparent that they present in an ordered fashion.

By way of further explanation of the type of cell structure present in graphene-based foams according to the present invention it will be convenient to make a comparison with a honeycomb-like cellular structure. A honeycomb cellular structure presents a three-dimensional network of interconnected and ordered open cells, with the open cells being defined by cell walls having a wall height that is greater than the wall thickness.

Accordingly, in one embodiment the graphene-based foam has a honeycomb-like structure defined by a three-dimensional network of interconnected and ordered open cells.

By the graphene-based foam having a "honeycomb-like" structure is meant that the foam structure resembles that of honeycomb, but may nevertheless present degrees of structural irregularities that deviate from a more "perfect" honeycomb structure. In other words, by being "honeycomb-like" is intended to mean that a person skilled in the art would consider the foam structure to have honeycomb shape characteristics.

Reference to honeycomb-like characteristics of the graphene-based foam may also assist with further qualifying what is meant by the term "ordered" open cells. In particular, those skilled in the art will appreciate that a honeycomb structure is made up of relatively ordered open cells. Accordingly, reference to the open cells being "ordered" is intended to mean an overall general impression that a collection of adjacent cells are orientated in a similar direction.

To further assist with what is meant by the graphene-based foam having a "three-dimensional network of interconnected and ordered open cells" it will be convenient to refer to the edge connectivity of the open cells. In one embodiment, the open cells have an edge connectivity of 3. By "edge connectivity" is meant the number of cell wall edges that intersect together within the interconnected and ordered cell network. For example, a typical hexagonal honeycomb cell structure has an edge connectivity of 3, whereas a honeycombs with a square cell structure have an edge connectivity of 4 and honeycombs with a triangular cell structure have an edge connectivity of 6.

Graphene-based foams in accordance with the invention having a honeycomb-like structure will typically exhibit a hexagonal-like cell structure.

In one embodiment, the cross sectional shape of the open cells is anisotropic. In that case, the graphene-based foam has a structure defined by a three-dimensional network of interconnected and ordered open cells having an anisotropic cross section.

In one embodiment, the cross sectional shape of the open cells is substantially hexagonal.

In another embodiment, the alignment of the open cells is substantially unidirectional. In other words, the height direction of the cell walls all point in substantially the same direction.

The ordered nature of the cells represents one structural level of the overall hierarchical structure of the foam.

The open cells of the graphene-based foam are defined by cell walls formed of graphene (sheets), partially reduced graphene oxide (sheets), reduced graphene oxide (sheets), or a combination thereof. In other words, the cell walls are formed entirely from this graphene-based material. As previously noted, the cell walls have height and thickness dimensions, with the height dimension being greater than the thickness dimension.

A second structural level of the hierarchical structure of the foam is found in the construction of the cell walls. In particular, the cell walls have a thickness defined by the thickness of a plurality of graphene sheets, partially reduced graphene oxide sheets, reduced graphene oxide sheets, or a combination thereof. The graphene-based sheets that form the cell walls typically present in a layered formation. For example, at least a section of a cell wall may be formed of three to five layered graphene-based sheets, with these sheets being orientated to form the cell wall such that the thickness of the three to five layered sheets define the thickness of the cell wall.

In one embodiment, the cell walls have a thickness defined by the thickness of a plurality of layered graphene sheets, partially reduced graphene oxide sheets, reduced graphene oxide sheets, or a combination thereof.

For avoidance of any doubt, reference to the "thickness" of a plurality of layered graphene sheets, partially reduced graphene oxide sheets, reduced graphene oxide sheets, or a combination thereof is intended to mean the cumulative sheet thickness of the plurality of layered graphene-based sheets.

By the cell walls being formed in the manner outlined herein it will be appreciated that the graphene-based sheets not only present as a plurality of layers to define the thickness of the cell wall, but some of the layered sheets may also only partially overlap. Accordingly, the cell walls may be seen to be constructed of a plurality of layered graphene-based sheets, some of which may only partially overlap. Despite some of the graphene-based sheets only partially overlapping within the layered structure, the thickness of the cell wall will nevertheless be defined by at least two layered graphene-based sheets.

As there may be slight variation in cell wall thickness across each cell in a given foam, it is often more convenient to refer to the average cell wall thickness.

The average cell wall thickness will generally range from about 2 nm to 1000 nm, or from 2 nm to 700 nm, or from 2 nm to 500 nm, or from 2 nm to 250 nm, 2 nm to 100 nm, or from about 2 nm to about 50 nm, or from about 2 nm to about 30 nm.

Each open cell of the graphene-based foam in accordance with the invention defines a pore size. Reference to "pore size" herein is intended to mean the distance presented by the diameter of a cross section of a given cell. As the cross sectional shape of a given cell may not be circular, reference to the cross sectional "diameter" is intended to mean the largest cross sectional distance between the cell walls. As there may be slight variation in pore size of a given graphene-based foam according to the invention, it is often more convenient to refer to the average pore size.

Accordingly, in one embodiment the open cells define an average pore size ranging from about 1 to about 100 µm, or from about 10 to about 80 µm, or from about 20 to about 60 µm.

Without wishing to be limited by theory, it is believed that the ratio of the average wall thickness to the average pore size present in the graphene-based foams according to the invention can be important in determining the improved properties of the foam. Generally, the ratio of the average wall thickness to the average pore size will range from about 1:50 to about 1:25,000. In one embodiment, the ratio of the average wall thickness to the average pore size ranges from about 1:100 to about 1:10,000, or from about 1:500 to about 1:8,000, or from about 1:1,000 to about 1:8,000.

It will be appreciated that structural features of the foam such as the pore size and cell wall thickness will influence the overall density of the graphene-based foam according to the invention. The foams according to the invention can advantageously be prepared to exhibit a variety of densities including a very low density. For example, the foams can be prepared having a density of only about 0.5 mg/cm$^3$. Surprisingly, even at such low densities the foams according to the invention can still exhibit improved properties such as excellent elasticity.

In one embodiment, the density of the graphene-based foam ranges from about 0.5 mg/cm$^3$ to about 10 mg/cm$^3$, or from about 0.5 mg/cm$^3$ to about 7 mg/cm$^3$, or from about 0.5 mg/cm$^3$ to about 5 mg/cm$^3$.

In a further embodiment, the graphene-based foam in accordance with the invention has a density ranging from about 0.5 mg/cm$^3$ to about 2 mg/cm$^3$.

Where the density of the graphene-based foam falls below about 1 mg/cm$^3$ some of the graphene-based sheets that form the cell wall may be present in the form of a tubular structure rather than stacked or layered sheets. Without wishing to be limited by theory it is believed that the tubular graphene-based structures form because the low density structures have extremely thin cell walls and when present in such a state the graphene-based sheets are prone to scrolling up to form a tubular structure. Accordingly, where a cells wall become very thin it may simply scroll up to create a tubular strut. Such tubular struts may form part of the overall foam structure and present as a reticulated foam structure.

In one embodiment, the foam further comprises graphene sheets, partially reduced graphene oxide sheets, reduced graphene oxide sheets, or a combination thereof in the form of a tubular structure. The tubular structure will have a thickness (or diameter) defined by scrolled graphene sheets, partially reduced graphene oxide sheets, reduced graphene oxide sheets, or a combination thereof.

Accordingly, in one embodiment the foam includes a reticulated structure defined by a three-dimensional network of interconnected struts, the struts being formed of graphene sheets, partially reduced graphene oxide sheets, reduced graphene oxide sheets, or a combination thereof in scrolled formation.

Those skilled in the art will appreciate that foams having a "reticulated structure" refers to a 3D net like foam structure. In the context of the present invention, the "net" is represented by the interconnected struts, where the struts are formed from the scrolled graphene-based sheets.

Reference herein to morphological features and dimensions of the graphene-based foams according to the invention can be readily measured or determined using techniques well known in the art such as scanning electron microscopy (SEM) and transmission electron microscopy (TEM).

Graphene-based foams in accordance with the invention advantageously exhibit improved mechanical properties. For example, the foams or compositions comprising the foams exhibit excellent structural elasticity. The structural elasticity of the foams can be observed when measuring their compression set. Reference to "compression set" herein is intended to mean a measurement of the permanent deformation remaining after release of a compressive stress that is applied to the foam or composition.

Compression set is expressed as the percentage of the original deflection (i.e. a constant deflection test). Accordingly, a test specimen of the graphene-based foam or composition comprising the graphene-based foam is compressed at a nominated % for one minute at 25° C. Compression set is taken as the % of the original deflection after the specimen is allowed to recover at standard conditions for 30 minutes. The compression set value C can be calculated using the formula $[(t_0-t_i)/(t_0-t_n)] \times 100$, where $t_0$ is the original specimen thickness, $t_i$ is the specimen thickness after testing, and $t_n$ is the spacer thickness which sets the % compression that the foam is to be subjected. For comparative results, the specimens to be tested should have the same dimensions where the diameter is about 12 mm, and the height is about 8 mm. The compression set measurement is based on that outlined in ASTM D395.

In one embodiment, the graphene-based foam in accordance with the invention has a compression set at 15% compression of 20% or less, or 15% or less, or 10% or less. In other words, the foam specimen can be compressed 15% of its volume or height and upon release of the compressive stress the 15% deflection in the foam recovers by at least about 97%, or at least about 97.8%, or at least about 98.5%.

In a further embodiment, the graphene-based foam in accordance with the invention has a compression set at 30% compression of 20% or less, or 15% or less, or 10% or less.

In a further embodiment, the graphene-based foam in accordance with the invention has a compression set at 50% compression of 15% or less, or 10% or less, or 7% or less.

In a further embodiment, the graphene-based foam in accordance with the invention has a compression set at 70% compression of 15% or less, or 10% or less, or 7% or less.

In a further embodiment, the graphene-based foam in accordance with the invention has a compression set at 80% compression of 15% or less, or 10% or less, or 5% or less.

In a further embodiment, the graphene-based foam in accordance with the invention has a compression set at 90% compression of 15% or less, or 10% or less, or 5% or less.

In a further embodiment, the graphene-based foam in accordance with the invention has a compression set at 95% compression of 15% or less, or 10% or less, or 5% or less.

In practical terms, the elastic properties of the graphene-based foams in accordance with the invention enable the foam to be highly compressed and yet have the ability to bounce back into its original shape.

When measuring the compression set of the graphene-based foam per se, those skilled in art will appreciate that as the density of the foam decreases the foam can be compressed with a corresponding reduction in volume. In that case, a compression set measured at 20% compression may result in a 20% reduction in both height and volume of the sample. In contrast, a polymer/graphene-based foam composite may have no free internal volume. Accordingly, when its compression set is measured the volume of the composite may stay the same and a 20% compression may result in a 20% reduction in only the height of the sample. In either case, the measured compression set will be taken as the % of the original deflection after the specimen is allowed to recover at standard conditions for 30 minutes.

In one embodiment, a composition comprising the graphene-based foam in accordance with the invention has a compression set at 15% compression of 20% or less, or 15% or less, or 10% or less. In other words, the composition specimen can be compressed 15% of its volume or height and upon release of the compressive stress the 15% deflection in the foam recovers by at least about 97%, or at least about 97.8%, or at least about 98.5%.

In a further embodiment, a composition comprising the graphene-based foam in accordance with the invention has a compression set at 30% compression of 20% or less, or 15% or less, or 10% or less.

In a further embodiment, a composition comprising the graphene-based foam in accordance with the invention has a compression set at 50% compression of 15% or less, or 10% or less, or 7% or less.

In a further embodiment, a composition comprising the graphene-based foam in accordance with the invention has a compression set at 70% compression of 15% or less, or 10% or less, or 7% or less.

In a further embodiment, a composition comprising the graphene-based foam in accordance with the invention has a compression set at 80% compression of 15% or less, or 10% or less, or 5% or less.

In a further embodiment, a composition comprising the graphene-based foam in accordance with the invention has a compression set at 90% compression of 15% or less, or 10% or less, or 5% or less.

In a further embodiment, a composition comprising the graphene-based foam in accordance with the invention has a compression set at 95% compression of 15% or less, or 10% or less, or 5% or less.

The porous nature of the foams also makes them particularly effective absorbent materials. For example, the foams are effective at absorbing organic liquids such as oil of fat.

The graphene-based foam in accordance with the invention may also comprise polymer. In that case, it will be appreciated that the underlying structure of the graphene-based foam will be formed only of graphene, partially reduced graphene oxide, reduced graphene oxide, or a combination thereof, and the polymer may therefore be present as a coating on, or filling material for, this underlying structure.

Accordingly, in one embodiment the open cells of the graphene-based foam are provided with a polymer coating. In that case, the cell walls will be formed of graphene sheets, partially reduced graphene oxide sheets, reduced graphene oxide sheets, or a combination thereof having a surface coating of polymer. Taking into account the presence of the coating the cell wall thickness may therefore be defined by the thickness of a plurality of layered graphene sheets, partially reduced graphene oxide sheets, reduced graphene oxide sheets, or a combination thereof and, the thickness of the polymer coating(s).

Suitable polymers that may be used to form a coating on the surface of the open cells include, but are not limited, polyvinyl alcohol (PVA), poly(methyl methacrylate) (PMMA), polydimethylsiloxane (PDMS), polyethylene glycol (PEG), and polyacylonitrile (PAN).

The present invention also provides for a composition comprising the graphene-based foam. The composition may be a polymer composition, for example a polymer hydrogel. Unique properties of the graphene-based foam can advantageously be imparted to such polymer compositions.

Polymer hydrogels are renowned for having a polymeric matrix that can absorb and be swollen by aqueous liquids such as water. Despite numerous advantageous properties, hydrogels typically exhibit relatively poor mechanical properties and electrical conductivity. Numerous attempts have been made to improve the mechanical properties and electrical conductivity of hydrogels. For example, filler materials (e.g. carbon nanotubes) have been combined with hydrogels. However, to impart any property change the filler material typically must have a strong interaction with the polymeric matrix of the hydrogel. This strong interaction in turn can adversely effect desirable properties of the hydrogel. For example, incorporation of filler materials into stimulus responsive polymer hydrogels can impair the stimulus responsive behaviour and gel-like properties of the hydrogels.

The graphene-based foam in accordance with the invention presents inherent electrical conductivity and excellent mechanical properties. Furthermore, these properties can be attained at a very low foam density. Incorporating the graphene-based foam into polymer hydrogels has surprisingly been found to (i) not only retain such inherent properties of the graphene-based foam, but also (ii) have limited if no adverse impact on the properties of the hydrogel per se. In other words, hydrogels incorporating the graphene-based foam can exhibit many in not all of their inherent desirable properties together with electrical conductivity and improved mechanical properties imparted by the graphene-based foam.

In one embodiment, the composition according to the invention is a polymer composition. In a further embodiment, the polymer composition is a polymer hydrogel. In yet a further embodiment, the polymer hydrogel is a stimulus responsive polymer hydrogel.

Stimulus responsive polymers (also referred to as "smart" polymers) are known in the art as polymers which undergo a physical change in response to stimuli such as a change in temperature, pH, ionic strength and/or wavelength of light.

In the form of a hydrogel, a stimulus responsive polymer must of course present a polymeric matrix that can absorb and be swollen by an aqueous liquid.

The physical change exhibited by a stimulus responsive polymer in response to a given stimulus can vary depending upon the type of polymer employed. One form of physical change important in the context of the present invention is where in response to a stimulus the polymer undergoes a reversible transition from being hydrophobic in character to being hydrophilic in character.

In one embodiment, a stimulus responsive polymer used in accordance with the invention is of a type that in response to a stimulus undergoes a transition, preferably a reversible transition, from being hydrophobic in character to being hydrophilic in character or vice versa.

In one embodiment, a stimulus responsive polymer used in accordance with the invention comprises a temperature responsive polymer that in response to a change in temperature undergoes a transition, preferably a reversible transition, from being hydrophobic in character to being hydrophilic in character or vice versa.

Those skilled in the art will appreciate that expressions such as "hydrophobic in character" and "hydrophilic in character" are generally used in the art to convey favourable or unfavourable interactions between one substance relative to another (e.g. attractive or repulsive interactions) and not to define absolute qualities of a particular substance. For example, hydrophilic materials are more likely to be wetted, swollen or dissolved by an aqueous medium (attractive interaction), whereas hydrophobic materials are less likely to be wetted, swollen or dissolved by an aqueous medium (repulsive interaction). Unless otherwise stated, in the context of the present invention these expressions are intended to be a reference to the polarity of a material relative to the polarity of an aqueous liquid. Thus, by being hydrophilic in character a stimulus responsive polymer is more likely to be wetted, swollen or dissolved by an aqueous liquid. By being hydrophobic in character a stimulus responsive polymer is less likely to be wetted, swollen or dissolved by an aqueous liquid.

Representative stimulus responsive polymers include temperature responsive polymers, pH responsive polymers, light responsive polymers, and specific ion responsive polymers.

The stimulus responsive polymer may be in the form of a homopolymer or a copolymer.

The stimulus responsive polymer may be a natural polymer or a synthetic polymer.

Poly(N-isopropyl acrylamide) (P(NIPAAm)) is a well known temperature responsive polymer and exhibits a lower critical solution temperature (LCST) of about 36° C. in an aqueous liquid medium. It can reversibly assume (i) an expanded random coil structure below the LCST that is hydrophilic in character and readily wet or solvated by an aqueous liquid medium, and (ii) a collapsed globular structure above the LCST that is hydrophobic in character and not readily wet or solvated by an aqueous liquid medium.

Examples of suitable stimulus (temperature) responsive polymers include P(NIPAAm) homopolymer and copolymers of N-isopropyl acrylamide (NIPAAm) with one or more other ethylenically unsaturated monomers.

When NIPAAm is copolymerised with one or more hydrophilic comonomers such as acrylamide, the LCST of the copolymer can be raised relative to that of P(NIPAAm). The opposite may occur when it is copolymerised with one or more hydrophobic comonomers, such as N-t-butyl acrylamide. Copolymers of NIPAAm with hydrophilic monomers such as acrylamide have a higher LCST and generally a broader temperature range of precipitation (relative to P(NIPAAm)), while copolymers of NIPAAm with hydrophobic monomers such as N-t-butyl acrylamide have a lower LCST (relative to P(NIPPAAm) and are generally more likely to retain the sharp transition characteristic of P(NIPAAm).

Graphene-based foam according to the invention can function as a susceptor (i.e. it can absorb electromagnetic radiation and convert it to heat). Exposing temperature responsive polymers incorporating the graphene-based foam to electromagnetic radiation can therefore promote an increase in the polymers temperature to above its LCST. Such polymer systems can therefore advantageously be stimulated indirectly by exposure to electromagnetic radiation.

Examples of pH responsive polymers are generally derived from pH responsive vinyl monomers such as acrylic acid, methacrylic acid, and other alkyl-substituted acrylic acids, maleic anhydride, maleic acid, 2-acryamido-2-methyl-1-propanesulfonic acid, N-vinyl formamide, N-vinyl acetamide, aminoethyl methacrylate, phosphoryl ethyl acrylate or methacrylate. pH responsive polymers may also be prepared as polypeptides from amino acids (e.g. polylysine or polyglutiamic acid) all derived from naturally occurring polymers such as proteins (e.g. lysozyme, albumin, casein), or polysaccharides (e.g. alginic acid, hyaluronic acid, carrageenan, chitosan, carboxymethyl, cellulose) or nucleic acids such as DNA. pH responsive polymers usually comprise pendant pH sensitive functional groups such as —OPO(OH)$_2$, —COOH or —NH$_2$.

By copolymerising a monomer that gives rise to a temperature responsive polymer such as NIPAAm with a small amount (less than about 10 mole %) of a comonomer that gives rise to a pH responsive polymer such as acrylic acid, the resulting copolymer can display both temperature and pH responsiveness. The LCST of such a copolymer can remain unaffected, sometimes even lowered a few degrees, at a pH where the copolymer is not ionised, but the LCST can be dramatically raised if the pH sensitive groups become ionised. When pH sensitive groups are present at a high concentration, the LCST response of the temperature responsive effect may be for all practical purposes eliminated.

Block copolymers derived from pH and temperature responsive monomers can be prepared such that they retain both pH and temperature transitions independently. For example, a block copolymer having a pH responsive block (polyacrylic acid) and a temperature responsive block (P(NIPAAm)) can retain independent pH and temperature responsiveness.

Examples of light responsive polymers include those that contain chromophoric groups pendant to or along the main chain of the polymer and, when exposed to an appropriate wavelength of light, can be isomerised from a trans to a cis form, which can be dipolar and more hydrophilic and promote reversible polymer conformational changes. Other light sensitive groups can also be converted by light stimulation from a relatively non-polar hydrophobic, non-ionised state to a hydrophilic ionic state.

In the case of pendant light-sensitive groups such as a light-sensitive dye (e.g. aromatic azo compounds or stilbene derivatives), they may be conjugated to a reactive monomer (an exception is a dye such as chlorophyllin, which already comprises a vinyl group) and then homopolymerised or copolymerised with one or more other monomers, including temperature responsive or pH responsive monomers. The light sensitive group may also be conjugated to an end of a polymer chain, including a stimulus responsive polymer chain. Techniques for conjugating such light sensitive groups to monomers or polymer chains are known.

Generally, light responsive polymers will be prepared from vinyl monomers that contain light-sensitive pendant groups. Such monomers may be homopolymerised or copolymerised with one or more other ethylenically unsaturated monomers.

The light-sensitive groups may be dye molecules that isomerise or become ionised when they absorb certain wavelength of light, converting them from hydrophobic to hydrophilic confirmations or vice versa, or they may be dye molecules which give off heat when they absorb certain wavelength of light. In the former case, the isomerisation alone can cause chain expansion or collapse, while in the later case the polymer can precipitate if it is also temperature responsive.

Examples of chromophoric groups that may give rise to the light responsive properties include aromatic diazo dyes. When a dye of this type is exposed to 350-410 nm UV light, the trans form of the dye, which is hydrophobic in character, can be isomerised to its cis form, which is dipolar and more hydrophilic in character, this in turn can cause polymer conformational changes. Exposure of the dye to visible light at about 750 nm can reverse this phenomenon.

Examples of specific ion responsive polymers include polysaccharides such as carrageenan that change their confirmation, for example, from a random to an ordered confirmation, as a function of exposure to ions such as K$^+$ or Ca$^{2+}$. Other examples of specific ion responsive polymers include polymers with pendant ion chelating groups such histidine or EDTA.

Stimulus responsive polymer hydrogels may be prepared using techniques well known in the art.

The graphene-based foams in accordance with the invention can be prepared by a process comprising providing a dispersion of graphene sheets, partially reduced graphene oxide sheets, reduced graphene oxide sheets, or a combination thereof in a freeze castable medium, and subjecting the dispersion to freeze casting.

Freeze casting is a known wet shaping technique that involves preparing a dispersion of a material in a freeze castable medium, pouring the dispersion into a mold, freezing the dispersion while it is in the mold, and typically sublimating the now frozen freeze castable medium. A review of freeze casting of porous materials is provided in International Materials Reviews 2012, vol 57, No. 1 page 37-60.

Reference herein to a "freeze castable medium" is intended to mean a medium that can be used to form a dispersion of graphene, partially reduced graphene oxide, reduced graphene oxide, or a combination thereof, and can form a solid and undergo freeze casting. Those skilled in the art will appreciate the various liquids that can be used in the process according to the invention. For example, graphene exhibits more hydrophobic character than partially reduced graphene oxide or reduced graphene. A suitable freeze castable medium will be selected by taking this into account.

Examples of freeze castable mediums include an aqueous medium, an ethanol medium, a dimethylformamide (DMF) medium, a N-methyl-2-pyrrolidone (NMP) medium, an acetone medium, a dimethylsulfoxide (DMSO) medium, or combinations thereof.

In one embodiment, the cell walls of the graphene-based foam are (i) formed of partially reduced graphene oxide sheets, reduced graphene oxide sheets, or a combination thereof, and (ii) have a thickness defined by the thickness of a plurality of partially reduced graphene oxide sheets, reduced graphene oxide sheets, or a combination thereof.

In another embodiment, the process of preparing the graphene-based foam according to the invention comprises producing a dispersion of partially reduced graphene oxide sheets, reduced graphene oxide sheets, or a combination thereof in a freeze castable medium, and subjecting the dispersion to freeze casting.

Freeze casting of graphene oxide or graphene oxide/polymer dispersions has been reported. For example, see US 2010/0144904 and J. Am. Chem. Soc 2011, 133, 6122-6125. However, porous graphene-based structures formed according to these prior art techniques do not present the unique hierarchical structure of the graphene-based foams according to the present invention, and consequently they also do not present the improved properties of the graphene-based foams according to the present invention.

Without wishing to be limited by theory, it is believed that the unique structure of graphene-based foams according to the present invention is derived at least in part by the dispersion that is subject to freeze casting comprising graphene, partially reduced and/or reduced graphene oxide. In particular, those skilled in the art will appreciate that graphene oxide is highly hydrophilic. This hydrophilic character of graphene oxide is believed to render the sheets more prone to forming random arrangements. In contrast, graphene, partially reduced and reduced graphene oxide have no or a reduced atomic oxygen content relative to graphene oxide and are consequently less hydrophilic than graphene oxide. The reduced hydrophilicity of these graphene-based materials is believed to enable the sheets thereof to more readily form stable layered arrangements.

According to the process of the invention, it is believed that upon freezing the dispersion the graphene sheets, partially reduced graphene sheets and/or reduced graphene sheets are rejected from the forming frozen particles and entrapped in channels that develop between the growing frozen particles to form a continuous network whose ultimate structure is determined by the so formed frozen particles. Accordingly, the graphene-based sheets are forced to align along the advancing freezing particle walls while at the same time they are concentrated and squeezed at the forming solid crystal boundaries. This concentration and compaction effect is believed to provide for the highly ordered and layered cell wall construction. Furthermore, the graphene, partially reduced graphene oxide and reduced graphene oxide sheets provide for enhanced π-π sheet attraction. The enhanced π-π sheet attraction is in turn believed to provide for cell structures that are particularly stable and can maintain integrity upon removal of the freeze castable medium.

The ability for the graphene-based sheets to align along advancing freezing particles and be suitably compressed at the forming crystal boundaries is believed to be enhanced if the so formed freezing particles are anisotropic in shape. Accordingly, in one embodiment the freeze castable medium provides for anisotropic frozen particles during freeze casting.

It will be appreciated from the discussion above that freeze casting according to the process of the invention is conducted using a dispersion of graphene, partially reduced graphene oxide and/or reduced graphene oxide. Where the dispersion is to contain partially reduced graphene oxide and/or reduced graphene oxide, the dispersion may initially be prepared using graphene oxide and this graphene oxide partially reduced or reduced in situ so as to afford the dispersion of partially reduced and/or reduced graphene oxide. For example, a dispersion of graphene oxide in water may be prepared and a suitable reducing agent (e.g. ascorbic acid) introduced so as to promote reduction of the dispersed graphene oxide. If required, the temperature of the graphene oxide dispersion may be increased to promote the reduction.

Accordingly, in one embodiment, the process comprises providing a dispersion of graphene oxide in a freeze castable medium and promoting reduction of the graphene oxide so as to produce the dispersion of partially reduced and/or reduced graphene oxide in the freeze castable medium.

In one embodiment, the reduction is promoted by introducing a reducing agent into the dispersion.

Suitable reducing agents to promote reduction of graphene oxide include, but are not limited to, ascorbic acid, hydrazine, hydroquinone and sodium sulfite.

In another embodiment, the reduction is promoted by increasing the temperature of the dispersion. In that case, the temperature of the dispersion will typically be increased to about 150-250° C., for example about 250° C.

Where graphene oxide is used to prepare the dispersion of partially reduced and/or reduced graphene oxide, it will be important that the so formed partially reduced and/or reduced graphene oxide remains in a dispersed state so at so perform the process of the invention.

Those skilled in the art of freeze casting will appreciate the general parameters for controlling the morphological features of porous materials. For example, the density of the graphene-based foam may be varied by adjusting the concentration of the dispersion that is to be subjected to freeze casting. For example, a graphene-based foam having a density of 7 mg/cm$^3$ may be prepared using a dispersion comprising 7 mg/ml of graphene, partially reduced graphene oxide, reduced graphene oxide, or a combination thereof, or a graphene-based foam having a density of 5 mg/cm$^3$ may be prepared using a dispersion comprising 5 mg/ml of graphene, partially reduced graphene oxide, reduced graphene oxide, or a combination thereof, or a graphene-based foam having a density of 2.5 mg/cm$^3$ may be prepared using a dispersion comprising 2.5 mg/ml of graphene, partially reduced graphene oxide, reduced graphene oxide, or a combination thereof, or a graphene-based foam having a density of 1 mg/cm$^3$ may be prepared using a dispersion comprising 1 mg/ml of graphene, partially reduced graphene oxide, reduced graphene oxide, or a combination thereof, or a graphene-based foam having a density of 0.5 mg/cm$^3$ may be prepared using a dispersion comprising 0.5 mg/ml of graphene, partially reduced graphene oxide, reduced graphene oxide, or a combination thereof, and so on.

Where graphene oxide is to reduced in situ, the mass of partially reduced and/or reduced graphene oxide can simply be replaced with graphene oxide. For example, a graphene-based foam having a density of 7 mg/cm$^3$ may be prepared using a dispersion comprising 7 mg/ml of graphene oxide that is to be subsequently reduced, and so on.

A dispersion of graphene sheets, partially reduced graphene oxide sheets, reduced graphene oxide sheets, or a combination thereof in a freeze castable medium is used to prepare the graphene-based foam.

The dispersion that is freeze cast to form the graphene-based foam will generally be substantially free of graphene oxide.

The dispersion that is freeze cast to form the graphene-based foam will generally be substantially free of polymer.

In one embodiment, the dispersion that is freeze cast to form the graphene-based foam is substantially free of graphene.

The only graphene material in the dispersion that is freeze cast to form the graphene-based foam will typically be selected from graphene sheets, partially reduced graphene oxide sheets, reduced graphene oxide sheets, and a combination thereof.

In one embodiment, the only graphene material in the dispersion that is freeze cast to form the graphene-based foam is selected from partially reduced graphene oxide sheets, reduced graphene oxide sheets, and a combination thereof.

As used herein the expression "graphene material" is intended to embrace graphene and any derivative thereof such as partially reduced graphene oxide, reduced graphene oxide and graphene oxide.

The pore size of the foam may be varied by controlling parameters such as the freezing temperature, the concentration of the graphene, partially reduced and/or reduced graphene oxide in the dispersion, and where appropriate also the degree of reduction of the graphene oxide. For example, a graphene-based foam with 20 µm pore size can be obtained by freeze casting of 5 mg/ml partially reduced graphene dispersion in dry ice, or a graphene-based foam with 10 µm pore size can be obtained by freeze casting of 5 mg/ml partially reduced graphene dispersion in liquid nitrogen, or a graphene-based foam with 50 µm pore size can be obtained by freeze casting of 1 mg/ml reduced graphene dispersion in dry ice The cell wall thickness may be varied by controlling the density of graphene-based foam. For example, a graphene-based foam with density of 0.5 mg/cm$^3$ may have an average wall thickness of about 2 nm, or a graphene-based foam with density of 1.0 mg/cm$^3$ may have an average wall thickness of about 4 nm, or a graphene-based foam with density of 5 mg/cm$^3$ may have an average wall thickness of about 8 nm.

The freeze castable medium can be removed after freeze casting by techniques known in the art such as freeze-drying, supercritical drying or oven drying and air drying.

The graphene, partially reduced graphene oxide, and reduced graphene oxide used in accordance with the invention may be obtained commercially, or it may be derived from graphite and graphene oxide as described herein.

Unlike convention techniques for forming graphene-based foams, the process according to the invention advantageously results in little if no shrinkage of the foam. Accordingly, the process offers excellent control over the morphological features of the foam.

If desired, the so formed graphene-based foam may be subjected to annealing (heat treatment). By subjecting the foam to annealing, the C/O atomic ratio (for foams containing partially reduced graphene oxide and/or reduced graphene oxide) can be further increased and the attractive interaction between graphene-based sheets in the cell walls can be further enhanced. This in turn is believed to impart improved mechanical and electrical properties to the graphene-based foams.

In one embodiment, a graphene-based foam produced in accordance with the invention is heat treated in air at 200° C., or is heat treated at 500° C. in an inert atmosphere, or is heat treated at 1100° C. in an inert atmosphere. Suitable inert atmospheres include nitrogen or argon.

In one embodiment the open cells of the graphene-based foam are provided with a polymer coating. The resulting polymer coated graphene-based foam may then by pyrolysed so at to convert the polymer coating into graphene. In that case, the cell walls will be formed of graphene sheets, partially reduced graphene oxide sheets, reduced graphene oxide sheets, or a combination thereof having a surface coating of graphene derived form the polymer coating. The cell wall thickness will therefore then be defined by the thickness of a plurality of layered graphene sheets, partially reduced graphene oxide sheets, reduced graphene oxide sheets, or a combination thereof and the thickness of the graphene coating(s).

Where the graphene-based foam forms part of a composition, the foam may be incorporated into that composition by any suitable means. For example, where the composition is a polymer composition, a liquid or solvated form of the polymer may be introduced into the cell structure the foam. Alternatively, monomer may be introduced into cell structure the foam and subsequently polymerised to form polymer.

The present invention therefore further provides a process for preparing a polymer composition comprising graphene foam according to the invention, the process comprising introducing a liquid or solvated form of the polymer into the cell structure the foam.

The present invention also provides a process for preparing a polymer composition comprising graphene foam according to the invention, the process comprising introducing monomer into cell structure the foam and polymerising the monomer to form the polymer.

The improved properties of the graphene-based foams of the invention expand their utility compared conventional porous graphene-based materials that typically are quite brittle. For example, the graphene-based foams in accordance with the invention may find application in electrodes for energy storage, and in conversion devices such as supercapacitors, fuel cells and batteries, in capacitive desalination devices, in thermal and acoustic insulators, in chemical or mechanical sensors, in biomedical applications, in actuators, in adsorbents, as catalyst supports, in field emission, as a precursor for graphene-based film processing, in mechanical dampening, as filters, and in three dimensional flexible electronic components.

1. Electrodes for Energy Storage and Conversion Devices Such as Supercapacitors, Full Cells and Batteries as Well as Capacitive Desalination Devices.

The hierarchical cellular structure of the graphene-based foams provides a conductive network for electron transportation, a porous structure for ions/molecules diffusion and high specific surface area, thus it is attractive for energy storage and water desalination applications.

2. Thermal and Acoustic Insulators

High porosity, controllable density and high elasticity of the graphene-based foams are ideal materials for thermal and acoustic insulator. The high porosity and low density properties make the graphene-based foams a perfect material for these applications, and the highly elastic nature allows the graphene-based foams to withstand large deformation, thereby it has excellent durability.

3. Chemical or Mechanical Sensors

The hierarchical cellular structure of the graphene-based foams provides large channels for fast diffusion of ions/molecules. Thus, it can be used as sensor to detect chemicals in liquid or gas phases. In addition, the elastic and electrical conductive nature of the graphene-based foams makes it an excellent material for mechanical strain sensors. The ultra-light and controllable density, and flexibility of graphene-based foam is extremely sensitive to a wide range of pressure, allowing the use in wearable sensors for in vitro diagnostics and gesture control systems for electronic devices.

4. Biomedical Applications

The graphene-based foams can be used in biomedical applications, as the graphene-based material is bio-compatible. The highly porous graphene-based foam provides a soft scaffold with tuneable mechanical properties for tissue engineering. Moreover, the porous structure is able to load drug molecules. The high electrical conductivity allows the use of electrical stimulation for drug release control or control the growth of cells.

5. Actuators

The ultra-light structure of the graphene-based foams can be stimulated by electrical field, which can be used as actuators. In addition, the graphene-based foams can also be composited with other stimulatable materials to enhance the actuation performance, and also to be used with different stimulation signals, such as ion concentration, pH values and temperature.

6. 3D Skeleton for Composites (Ceramics, Polymers and Nanoparticles)

The graphene-based foams provides large space for composition of various functional materials. In terms of the function of the graphene-based foams, it can serve as a conductive filling/network and stable skeleton and reinforcement.

7. Adsorbents

The large specific area and porous structure of the graphene-based foams make it an excellent material for pollutant adsorbents. Furthermore, the graphene-based foams is an ideal material for solvents/oil adsorption. As it is highly elastic, it can be reused by squeezing out the adsorbed solvents/oils. And the ultralight property of the elastomer allows it floats on the surface of water to clean up oil spills.

8. Catalyst Supports

The graphene-based foams can also be used as catalyst supports, as it provides porous structure and large specific surface area. The structural/thermal stability and chemical inertness of the graphene-based foams allows it to be operated in various environments, including high temperature and strong acid/base solvent.

9. Field Emission

The orientation of graphene-based sheets in the graphene-based foams can be controlled by freezing conduction. Therefore, the graphene-based foams with highly oriented structure can be prepared for the use of field emission.

10. Precursor for Graphene-Based Film Processing

The hierarchical structure of the graphene-based foams can be further compressed or filtrated to prepare graphene-based film. In addition, a graphene composite film can also be synthesized by using graphene-based foam composite materials. This synthesis strategy provides a simple graphene-based film production route. The resulting graphene-based film can be used for various applications, including electrode for energy storage and water desalination.

In one embodiment, there is provided a graphene-based film produced by compressing a graphene-based foam according to the invention.

11. Mechanical Dampening

The graphene-based foams can be used for mechanical damping. The robust, high efficiency and elastic structure of the graphene-based foams is able to be used for energy adsorption during impact.

12. Filters

The controllable porous structure of the graphene-based foams can be used as filter. In addition, its porous structure with hydrophilic nature of the graphene-based foams can be used for oil-water filtration.

13. 3D Flexible Electronics

The unique elastic, electrical conductive and chemically inert nature of the graphene-based foams make them promising for design novel 3D flexible electronic devices.

The present invention therefore also provides an electrode, capacitor, fuel cell, battery, capacitive desalination device, thermal or acoustic insulator, chemical or mechanical sensor, actuator, adsorbent, catalyst support, and filter comprising the graphene based foam according to the invention.

The present invention also provides an electronic component comprising the graphene based foam according to the invention.

The present invention also provides a graphene-based film comprising or in the form of a permanently compressed graphene-based foam according to the invention.

EXAMPLES

Materials, Methods and Results (a) Preparation of Graphene Oxide

Graphene oxide (GO) was synthesized from graphite (SP-1, Bay Carbon) using the modified Hummers method as originally presented by Kovtyukhova and colleagues. The graphite powder (5 g) was place in an 80° C. solution of concentrated $H_2SO_4$ (7.5 ml), $K_2S_2O_8$ (2.5 g) and $P_2O_5$ (2.5 g). The resultant dark blue mixture was cooled to room temperature over a period time of 6 h, then carefully diluted with distilled water, filtered, and washed until the pH of the filtrate was close to 7 (Milli-Q® water was used in all experiments). The peroxidized product was dried in 50° C. oven overnight, and placed into cold (0° C.) concentrated $H_2SO_4$ (115 ml). $KMnO_4$ (15 g) was added gradually under stirring and the temperature of the mixture was kept below 20° C. The mixture was then stirred at 35° C. for 2 h. 230 ml of water was added into the mixture, after 15 min more water (700 ml) and 30% $H_2O_2$ (12.5 ml) were added to terminate the reaction. The mixture was then washed with 1:10 HCl solution (1.1 L). Afterwards the sample was subjected to 5 min of centrifugation at 3000 r.p.m. The sediment was collected, dispersed in water and centrifuged. This process was repeated 2~3 times, until no sediment was found. The graphite oxide dispersion was then subjected to dialysis to completely remove metal ions and acids. Graphene oxide was obtained by further sonication of graphite oxide in water.

(b) Preparation of Graphene-Based Foam

Figure 2:
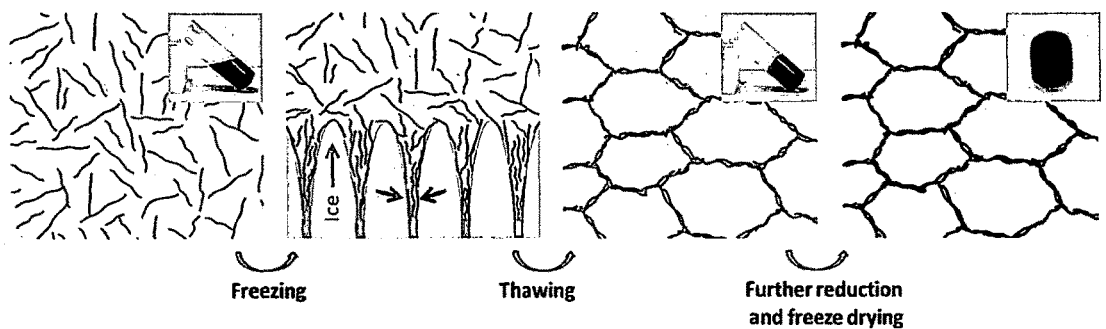
FIG. 2 is a schematic drawing of the process of preparing graphene-based foam according to the invention.

In a typical procedure for synthesis of a graphene monolith of 5.10 mg/cm$^3$, GO solution (1.5 ml, 5 mg/ml) was mixed with ascorbic acid of 15 mg in a 4 ml cylindrical glass vial, which was then placed in boiling water bath for 30 min to obtain a partially reduced GO dispersion. UV-vis spectroscopy was used to determine the reduction extent of graphene oxide. The spectra were taken from the dialyzed and diluted GO and partially reduced GO dispersion. As shown in FIG. 1, the UV-vis absorption peak of graphene oxide was (red) shifted from 231 nm to 256 nm, indicating partial reduction of graphene oxide. The vial was then immersed in a dry ice bath to freeze for 0.5 h. After being thawed at room temperature, the vial was placed in boiling water bath to further reduce GO for 8 h. The obtained gel was then sequentially subjected to dialysis in water (to remove soluble species), freezing drying and thermal annealing at 200° C. in air for 2 h. When the concentration of GO was adjusted to prepare monoliths with different densities, the ratio of GO to ascorbic acid by weight was kept consistent at 1:2. The preparation scheme is shown in the FIG. 2. With reference to FIG. 2, a well dispersed partially reduced graphene oxide (pr-GO) dispersion (the 1$^{st}$ scheme) is frozen, pr-GO sheets are concentrated at the boundary of ice crystals and then aligned along the growth direction of ice due to the squeezing effect (the 2$^{nd}$ scheme, side-view). The network retains its connectivity when the ice is thawed (the 3$^{rd}$ scheme, top-view). The pr-GO sheets are illustrated as slightly corrugated lines in the scheme with the brown lines representing pr-GO sheets whilst the black lines represent reduced graphene oxide sheets (rGO). Photos of the corresponding samples are presented in the insets.

Figure 3:
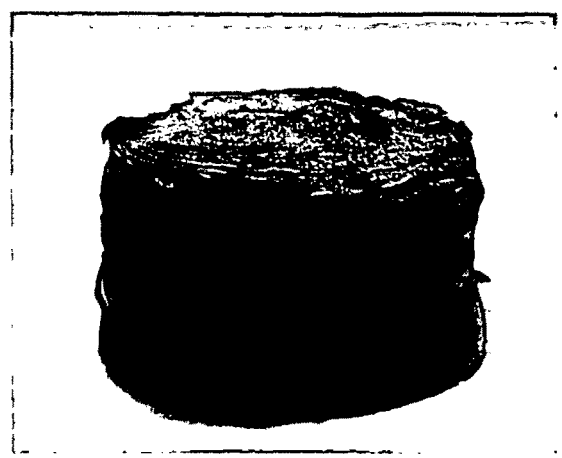
FIG. 3 shows an image of a graphene-based foam according to the invention.
Figure 4:
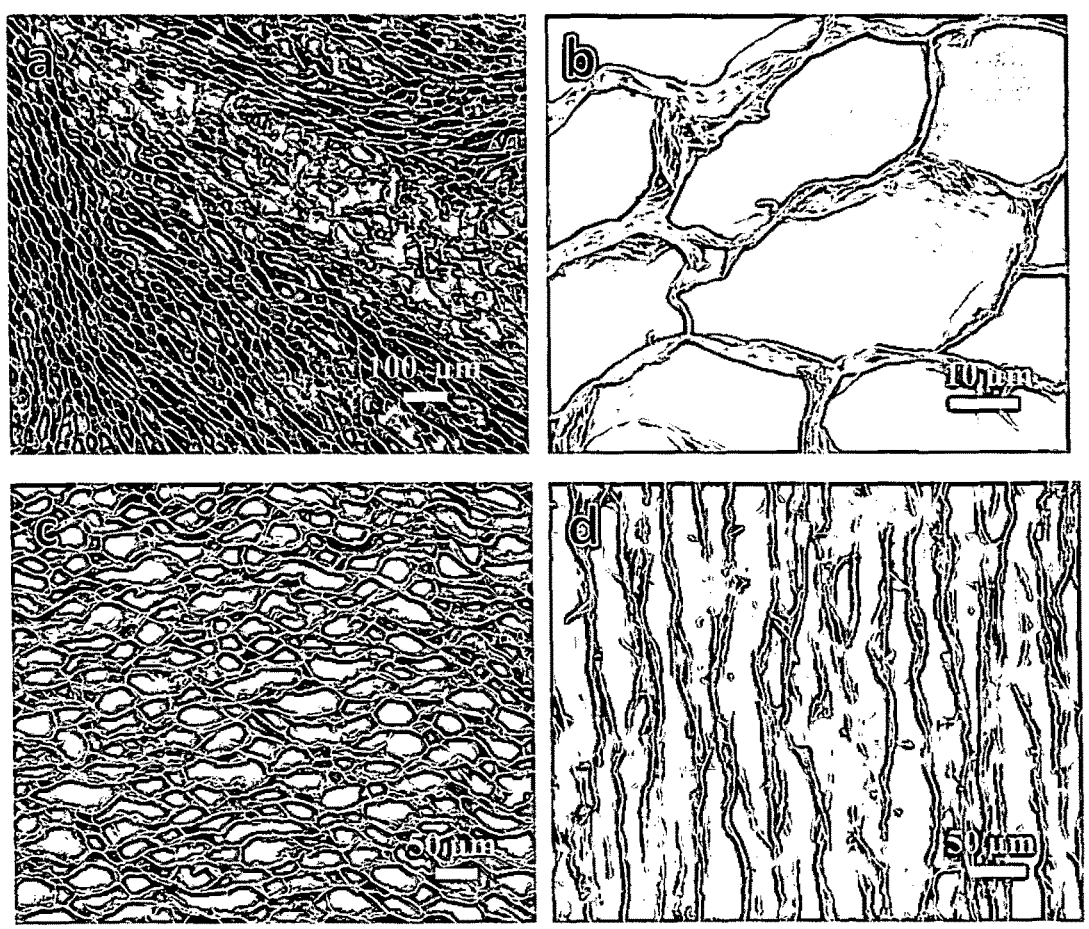
FIG. 4 illustrates SEM images of graphene-based foams (5.1 mg/cm$^3$) according to the invention; (a) the general view of the graphene-based foam; (b) the enlarged SEM image of section of (a); (c) a front-view of the cellular structure of graphene-based foam; and (d) a side-view of the cellular structure of graphene-based foam.

As shown in FIG. 3, the graphene-based foam (5.1 mg/cm$^3$) shows black texture. SEM image (FIG. 4) shows that the graphene-based foam is comprised of cellular clusters with different orientations, and each cluster is consist of numbers of honeycomb-like graphene cells with the cell dimension around 25 μm. High resolution transmission electron microscopy (HRTEM) analysis (FIG. 5 a) revealed that the graphene-based sheets in the cell wall are well oriented in a nearly parallel manner.

Figure 5:
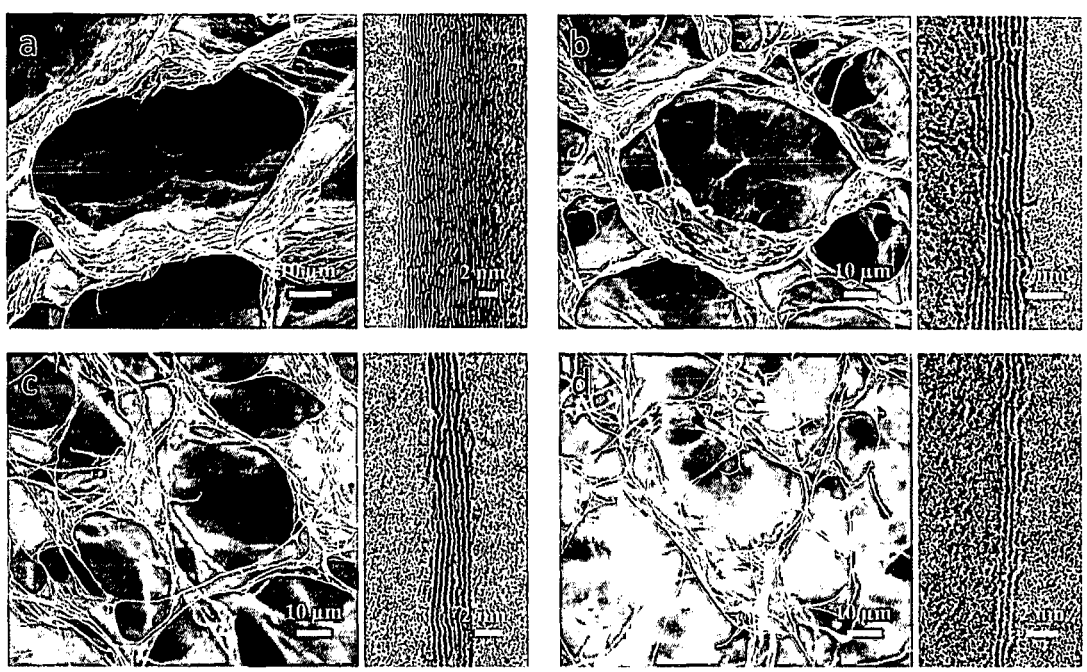
FIG. 5 illustrates the morphology and structure of graphene-based foams according to the invention with different densities. a-d, SEM (left) and TEM (right) images of monoliths with a density of 5.10 (a); 2.65 (b); 1.10 (c) and 0.56 mg/cm$^3$ (d)

Graphene-based foams with varied densities can be prepared by adjusting the concentration of the starting GO dispersion. As revealed by the SEM and TEM (FIG. 6) analysis, all graphene-based walls are consist of well packed graphene-based sheets and the number of stacked graphene-based sheets in the cell wall decreases with lowering the density. Fibrous structures started to appear when the density was reduced to lower than 1.1 mg/cm$^3$ (FIGS. 5 c and d).

(c) Application of Prepared Graphene-Based Foam

Figure 6:
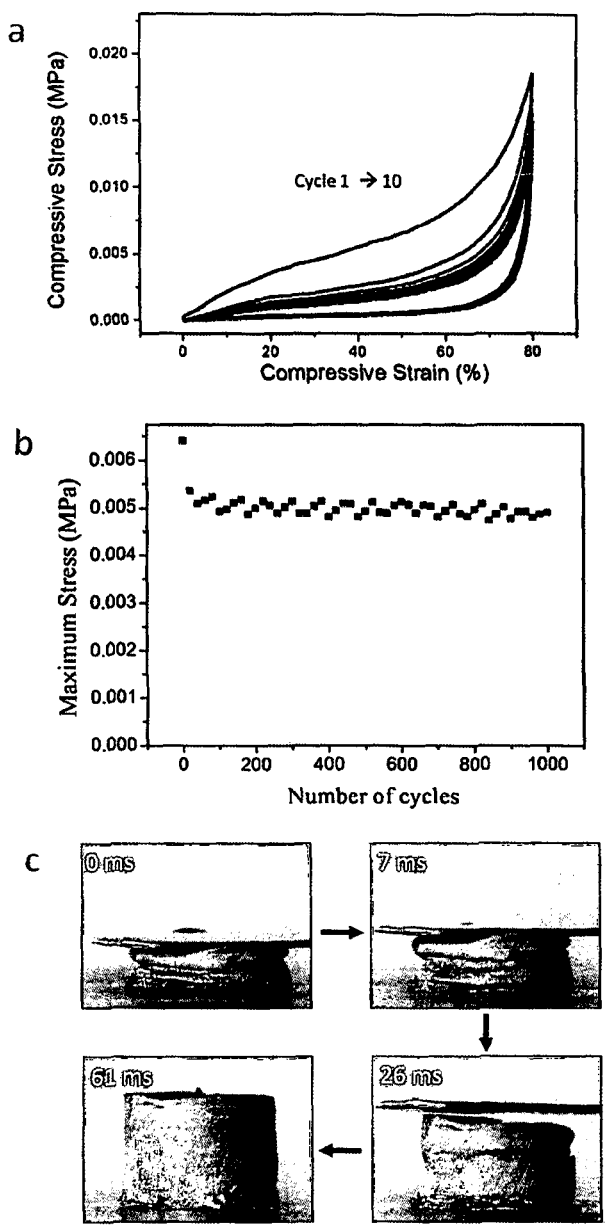
FIG. 6 illustrates (a) compressive stress-strain curves of 10 cycles of loading and unloading; (b) the maximum stress at 50% strain of a graphene-based foam according to the invention being repeatedly compressed for 1000 cycles, and (c) a set of real-time images of a compressed sample showing the recovering process.
Figure 7:
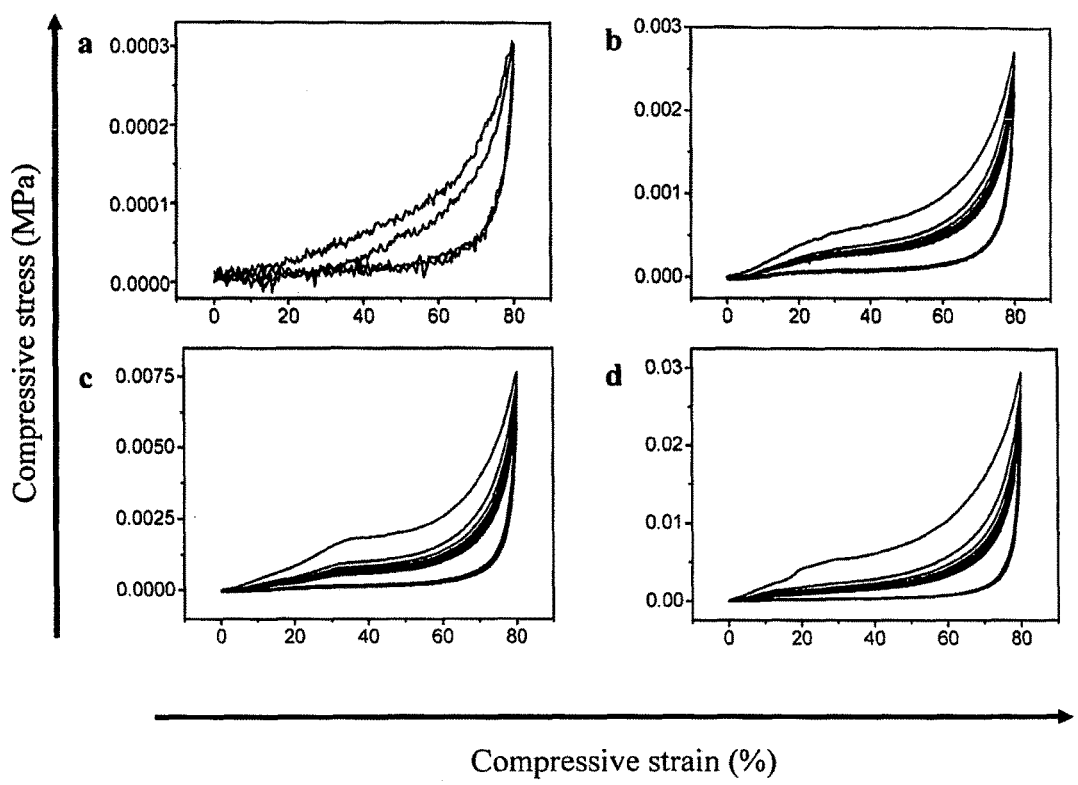
FIG. 7 Illustrates typical multi-cycles compressive stress-strain curves of graphene-based foams according to the invention with a range of densities, indicating elastic nature of graphene-based foam. a, 0.56; b, 1.55; c, 2.83 and d, 6.0 mg/cm$^3$.

The graphene-based foam was demonstrated for the application of mechanical damper. The samples were prepared in cylindrical shape (approximately 12 mm in diameter and 8 mm in height) for compressive tests. The compressive tests were performed in an Instron (Micro Tester, 5848, Instron) using a 10 N load cell and strain control mode with a strain rate of 100%/min. Filming of the recovery of a compressed graphene monolith was recorded using a high-speed camera operated at 700 frames per second. The graphene-based foam was compressed to 80% stain and was completely recover to its original shape rapidly when the loading was removed (FIG. 6 a). The graphene-based foam is able to adsorb large portion of energy during loading and unloading. As shown in FIG. 6 (a), the energy loss coefficient was calculated to be 82.5% at the first compressive cycle. The graphene-based foam shows excellent fatigue resistance. It was tested for over 1000 compressive loading and unloading, and it can retain 78% of its maximum stress at 50% strain (FIG. 6 b). In addition, the graphene-based foam can spring back in a fast rate, and it only took 61 ms to recover from 60% strain deformation (FIG. 6 c). The graphene-based foams with a range of densities show excellent compressibility. As shown in FIG. 7, the graphene-based foams with different densities can spring after removal of the compressive force.

Figure 8:
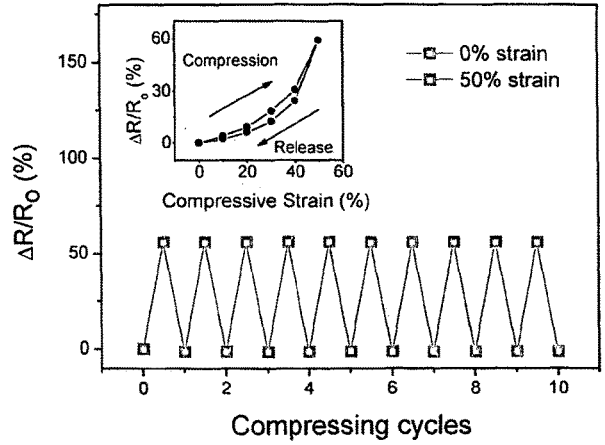
FIG. 8 illustrates electrical resistance change when repeatedly compressed up to 50% of strain for over 10 cycles of graphene-based foam according to the invention. The insert shows the result for one cycle.

The prepared graphene-based foam was demonstrated for the application of mechanical sensor. The electrical conductivity was determined by a two-probe method. To optimize the electrical contact between copper wires and elastomer, both ends of elastomer were carefully coated with a thin layer of silver paste. The monitoring of electrical resistance in relation to the number of mechanical compression was performed under a laser displacement sensor (LK-GD500, Keyence) and the change of electrical resistance was measured by a potentiostat (Model 363, Princeton Applied Research) controlled by an electronic digital interface (e-corder 401, eDAQ) with E-chart data acquisition program (E-chart, eDAQ). As shown in FIG. 8, the response of bulk electrical resistance of the graphene-based foam is highly constant over multiple cycles of compression.

Figure 9:
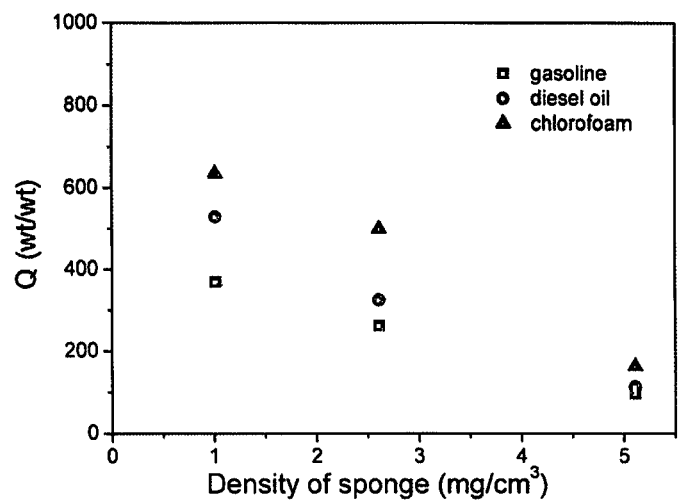
FIG. 9 illustrates absorption capacity of graphene-based foam according to the invention for a range of oils and solvents.

Graphene-based foam was directly used as excellent organic solvent adsorbent, revealing high absorption capacities (Q=weight after absorption/weight before absorption) and fast solvent up take rate on various solvents. As shown in FIG. 9, the graphene-based foam with the density of 1.0 mg/cm$^3$ was able to absorb chloroform with the Q value of 636, and diesel with the Q value of 529. The Q value of graphene-based foam is proportional to the solvent density and inverse proportional to elastomer density (FIG. 9). In addition, A 1 cm$^3$ sponge only took few seconds to saturate with solvent.

Figure 10:
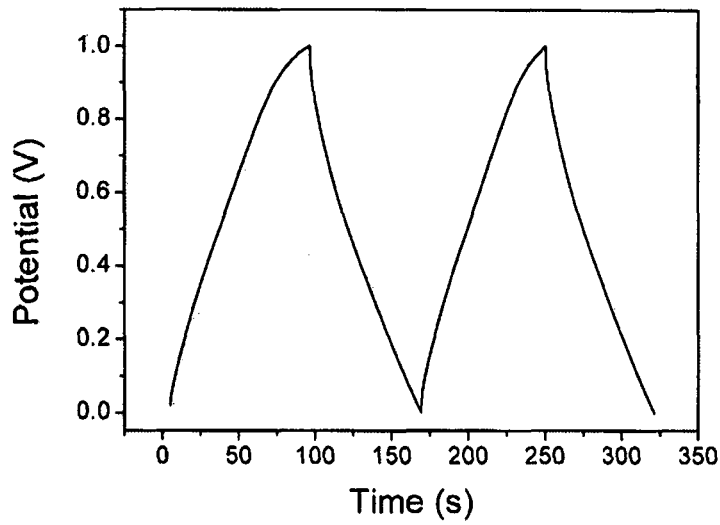
FIG. 10 illustrates charge/discharge curve of the compressed graphene-based foams according to the invention for the application as a supercapacitor.

Graphene-based foam was used as the electrode for the supercapacitor application. The graphene-based foam (wet, without removal of the solvent) was highly compressed to a membrane like electrode. Two compressed graphene-based foam electrodes were assembled in a symmetrical two-electrode configuration, where the electrodes were attached onto the Pt foil and were assembled to a sandwich like configuration with a filter paper separation. The performance of supercapacitor was examined by a Versastat-4 electrochemical workstation (Princeton Applied Research). The supercapacitance of the graphene-based foam was 146 F/g at charge/discharge rate of 1 A/g (FIG. 10).

Figure 11:
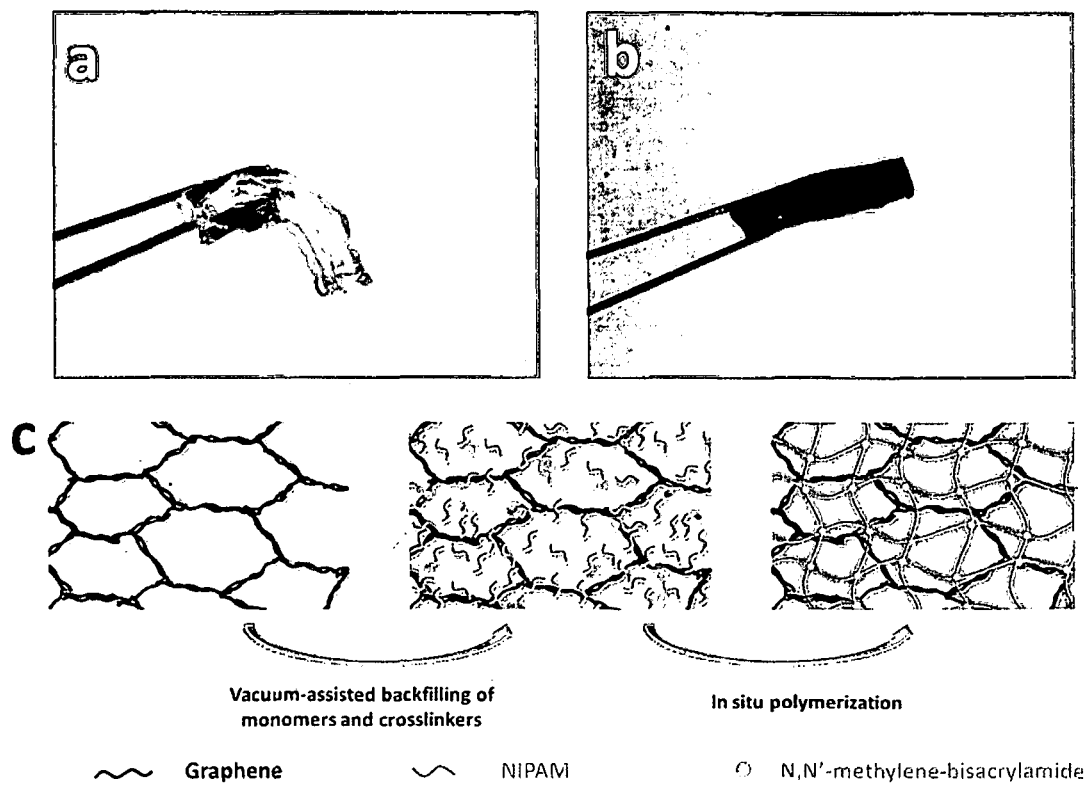
FIG. 11 illustrates images of (a) PNIPAM, (b) reinforced (P5-G0.25) hydrogel and (c) synthesis scheme for preparation of hydrogels incorporating graphene-based foam according to the invention (referred to herein as a "reinforced hydrogel")

Graphene-based foam according to the invention was demonstrated for the application of reinforcing functional polymer hydrogels. The graphene-based foam reinforced hydrogels were prepared by in situ polymerization of PNIAM within graphene-based foam cell network. In the typical synthesis processes, a mixture containing N-Isopropylacrylamide monomer (0.5 g), N', N'-methylene-bisacrylamide crosslinker (0.05 g), N', N'-tetramethylenediamine (20 μl) and H$_2$O (10 ml) was subjected to deoxygenation by bubbling with N$_2$ gas. The mixture was then filled into the graphene-based foam (1, 2.5 and 5 mg/cm$^3$) via vacuum assisted backfilling (FIG. 11c). The polymerization was carried out at ambient conditions for 12 h. The resulting reinforced hydrogels were noted as P5-G0.1, P5-G0.25 and P5-G0.5, corresponding to weight ratio of Poly(N-isopropylacrylamide) (PNIPAM) and graphene of 5% wt-0.1% wt, 5% wt-0.25% wt and 5% wt-0.5% wt, respectively.

To compare with the hydrogel without reinforcement, PINPAM hydrogel was prepared by using above process without backfilling into graphene-based foam, and noted as P5.

Characterization of the reinforced hydrogels: SEM images were obtained using a JOEL 7001F SEM, and the sample was freeze dried before SEM imaging. The weight of the reinforced hydrogels was confirmed with a balance (AND GH-252) with an accuracy of 0.01 mg. Compressive tests were performed in a Mini Instron (Micro Tester, 5845, Instron) using a 100 N load cell with the strain control mode at a strain rate of 100%/min. Electrical conductivity was measured by a two-probe method. To optimize the electrical contact between electrodes and the hydrogel, both ends of graphene-based foam were coated with silver paste before backfilling of the polymerisable mixture.

The graphene-based foam reinforced hydrogels show a combination of good mechanical, electrical and stimuli-responsive properties. As shown in FIGS. 11a and b, the freestanding reinforced hydrogel (b) is able to maintain its original shape under gravity while the PNIPAM hydrogel (a) is deformed, indicating the improvement of rigidness of the reinforced hydrogel.

Further detailed mechanical tests were performed to analyse the composite hydrogels. With incorporation of only 0.1-0.5% wt of graphene-based foam, both of the compressive strength and toughness of the resulting reinforced hydrogels are 6-8 times higher than those of pure PNIPAM hydrogel, and 40-300 times higher than those of the graphene foam per se (FIGS. 12a and b).

Figure 12:
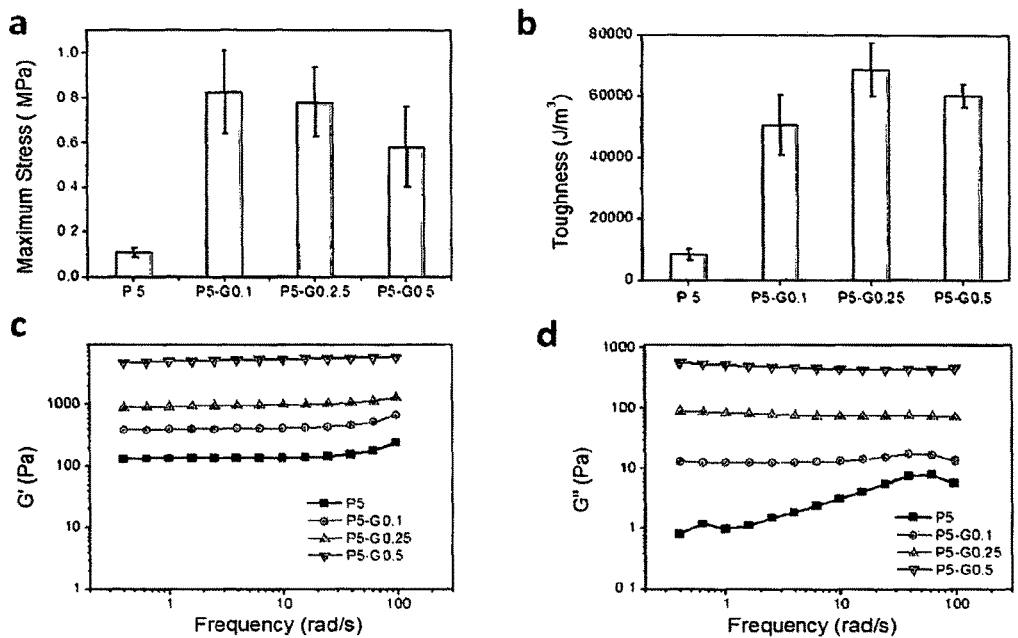
FIG. 12 illustrates (a) compressive strength and (b) toughness of PNIPAM hydrogel and reinforced hydrogels. (c) Storage (G') and (d) loss modulus (G") of PNIPAM hydrogel and graphene-based foam reinforced hydrogels with different graphene contents, indicating the improvement of mechanical performance of reinforced hydrogels.

The rheological tests also show that the storage and loss modulus of the reinforced hydrogel increase with graphene content (FIGS. 12c and d). The store modulus of reinforced hydrogel with only 0.5% wt graphene is one order of magnitude higher than pure PNIPAM hydrogel.

Figure 13:
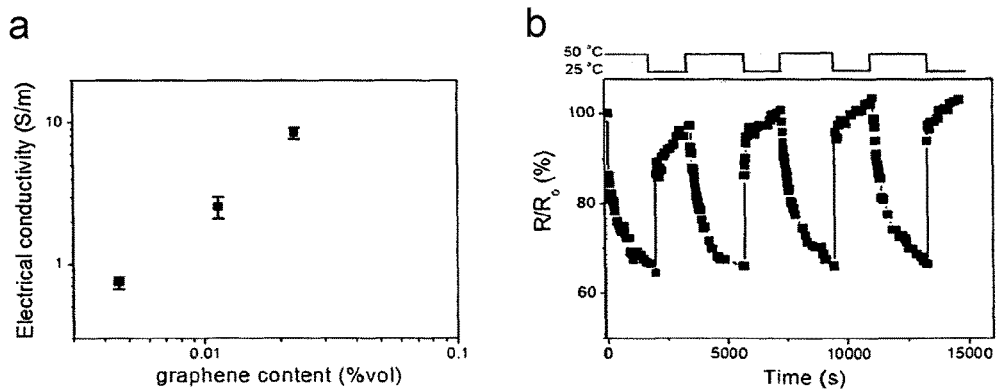
FIG. 13 illustrates (a) electrical conductivity of reinforced hydrogels and other reduced graphene oxide-based materials. (b) The resistance change of reinforced hydrogels when the temperature was modulated between 25° C. and 50° C.

The reinforced hydrogels have excellent electrical conductivity at extreme low graphene content. An effective conductive network With the conductivity of 0.7 S/m can be constructed with only ~0.045 vol. % (0.1 wt %) of graphene-based sheets. A very high conductivity of ~10 S/m is also found with ~0.23 vol. % (0.5% wt) of graphene-based sheets (FIG. 13a).

The electrical resistance of the reinforced hydrogels can be changed with modulation of temperature. As shown in FIG. 13b, the electrical resistance of reinforced hydrogel was decreased to 64% of its virgin value when temperature was raised from 25° C. to 50° C., and was able to recover when temperature was cooled.

Figure 14:
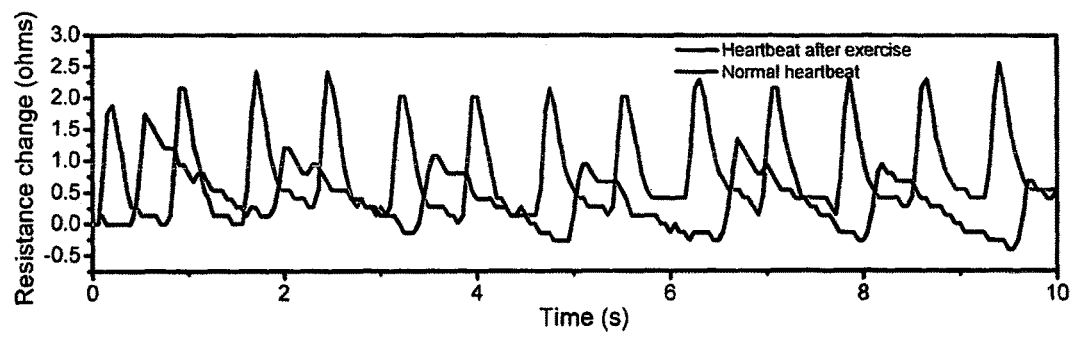
FIG. 14 illustrates monitor of heartbeats under normal and exercise conditions using a pressure sensor prepared with graphene-based foam according to the invention.

Graphene-based foam was demonstrated for the application as pressure sensor. In a typical synthesis process of a graphene-based foam sensor, graphene-based foam (1 mg/cm$^3$) was cut to a 1 mm thick film and sealed by two gold-coated polydimethylsiloxane layers. The resistance changes were recorded by a potentiostat (Model 363, Princeton Applied Research) controlled by an electronic digital interface (e-corder 401, eDAQ) with E-chart data acquisition program (E-chart, eDAQ). As shown in FIG. 14, heartbeats under two different conditions—normal (lower signal) and post-exercise (higher signal) were monitored with time. The sensor was able to monitor the magnitudes and frequencies of the corresponding biofeedback.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the phrase "consisting essentially of", and variations such as "consists essentially of" will be understood to indicate that the recited element(s) is/are essential i.e. necessary elements of the invention. The phrase allows for the presence of other non-recited elements which do not materially affect the characteristics of the invention but excludes additional unspecified elements which would affect the basic and novel characteristics of the method defined. For example, according to an embodiment of a method of the invention, the dispersion consists essentially of graphene sheets, partially reduced graphene oxide sheets, reduced graphene oxide sheets, or combinations thereof within a freeze castable medium. The dispersion may comprise elements such as reducing agent that do not materially affect the characteristics of the invention. However, the dispersion will not contain polymer which would materially affect the characteristics of the invention.

The invention claimed is:

1. A graphene-based foam, the graphene-based foam having a structure defined by a three-dimensional network of interconnected and ordered open cells, the open cells being defined by cell walls, the cell walls (i) being formed of graphene sheets, partially reduced graphene oxide sheets, reduced graphene oxide sheets, or a combination thereof, (ii) having a thickness defined by the thickness of a plurality of graphene sheets, partially reduced graphene oxide sheets, reduced graphene oxide sheets, or a combination thereof, and (iii) having an average height that is 100 to 5000 times greater than the average cell wall thickness, wherein the graphene-based foam has a compression set at 50% compression of 15% or less, wherein the graphene-based foam has an average cell wall thickness of about 2 nm to 1000 nm.

2. The graphene based foam according to claim 1, wherein the cell walls are formed of partially reduced graphene oxide sheets, reduced graphene oxide sheets, or a combination thereof.

3. The graphene based foam according to claim 1, wherein the interconnected and ordered open cells comprise cells with an edge connectivity of 3.

4. The graphene based foam according to claim 1 having a density ranging from about 0.5 mg/cm$^3$ to about 7 mg/cm$^3$.

5. An electrode, capacitor, fuel cell, battery, capacitive desalination device, thermal or acoustic insulator, chemical or mechanical sensor, actuator, adsorbent, catalyst support, or filter comprising the graphene based foam according to claim 1.

6. An electronic component comprising the graphene based foam according to claim 1.

7. The graphene based foam according to claim 1, comprising substantially no polymers.

8. A composite structure comprising a scaffold structure comprising the graphene based foam according to claim 1 and a polymer composition incorporated into the scaffold structure.

9. The composite structure according to claim 8, wherein the polymer composition is a hydrogel.

* * * * *